Figure 1:
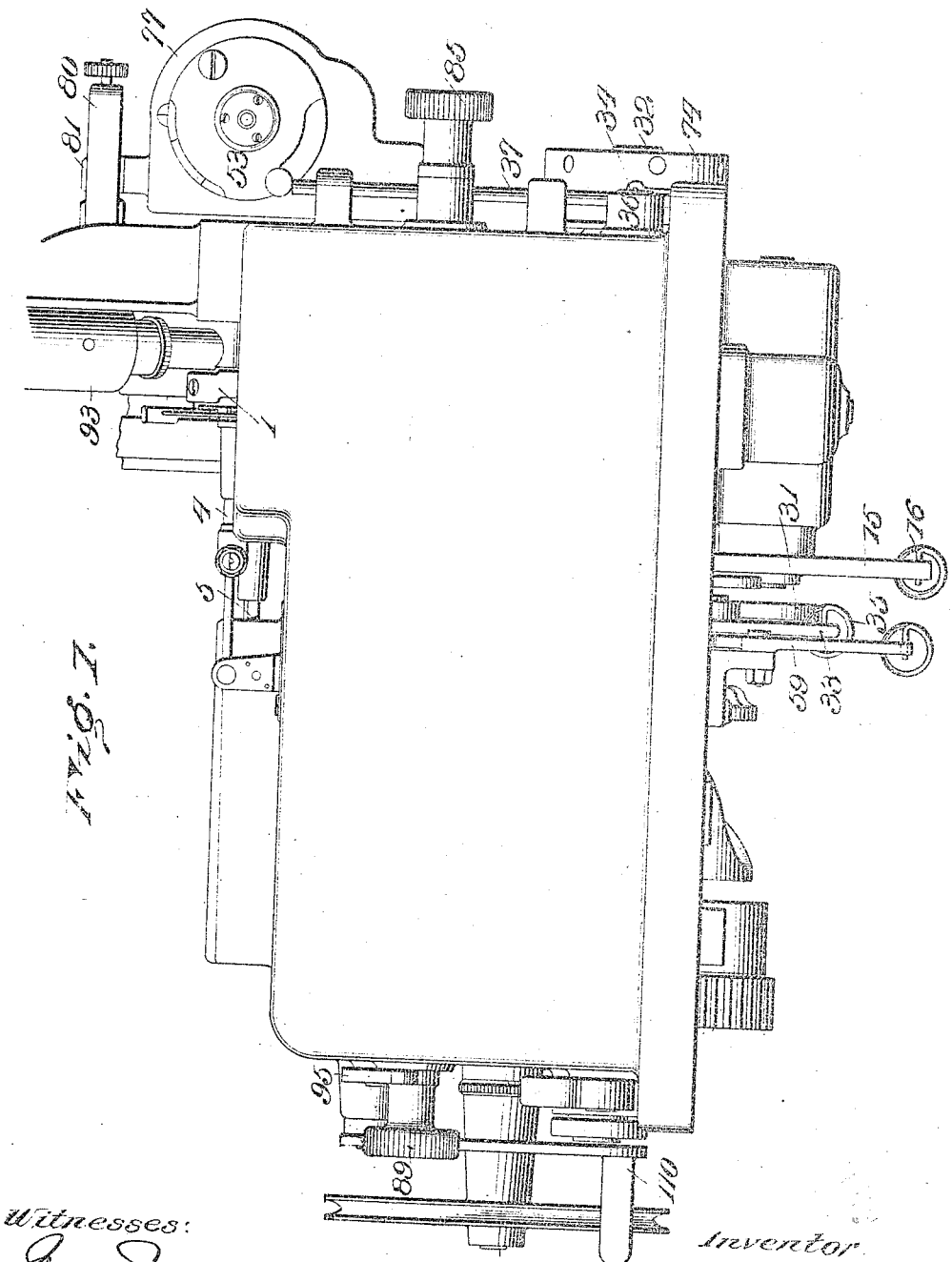

F. H. PIERPONT.
GAGING AND SORTING MECHANISM.
APPLICATION FILED JAN. 9, 1914.

1,149,287.

Patented Aug. 10, 1915.
12 SHEETS—SHEET 9.

F. H. PIERPONT.
GAGING AND SORTING MECHANISM.
APPLICATION FILED JAN. 9, 1914.

1,149,287.

Patented Aug. 10, 1915.
12 SHEETS—SHEET 10.

Witnesses:

Inventor
F. H. Pierpont
by Church & Church
Attorneys.

F. H. PIERPONT.
GAGING AND SORTING MECHANISM.
APPLICATION FILED JAN. 9, 1914.
1,149,287.
Patented Aug. 10, 1915.
12 SHEETS—SHEET 11.
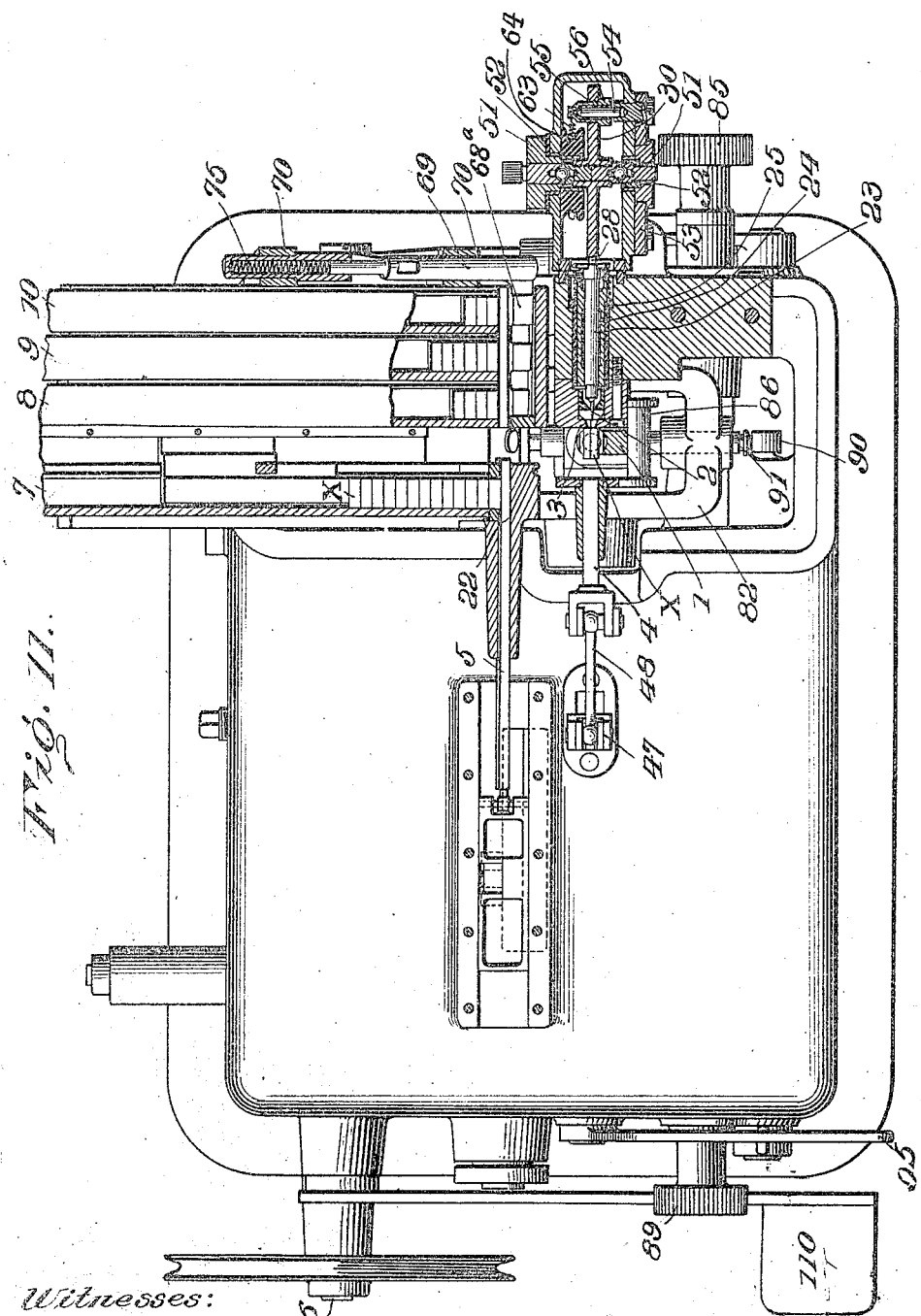

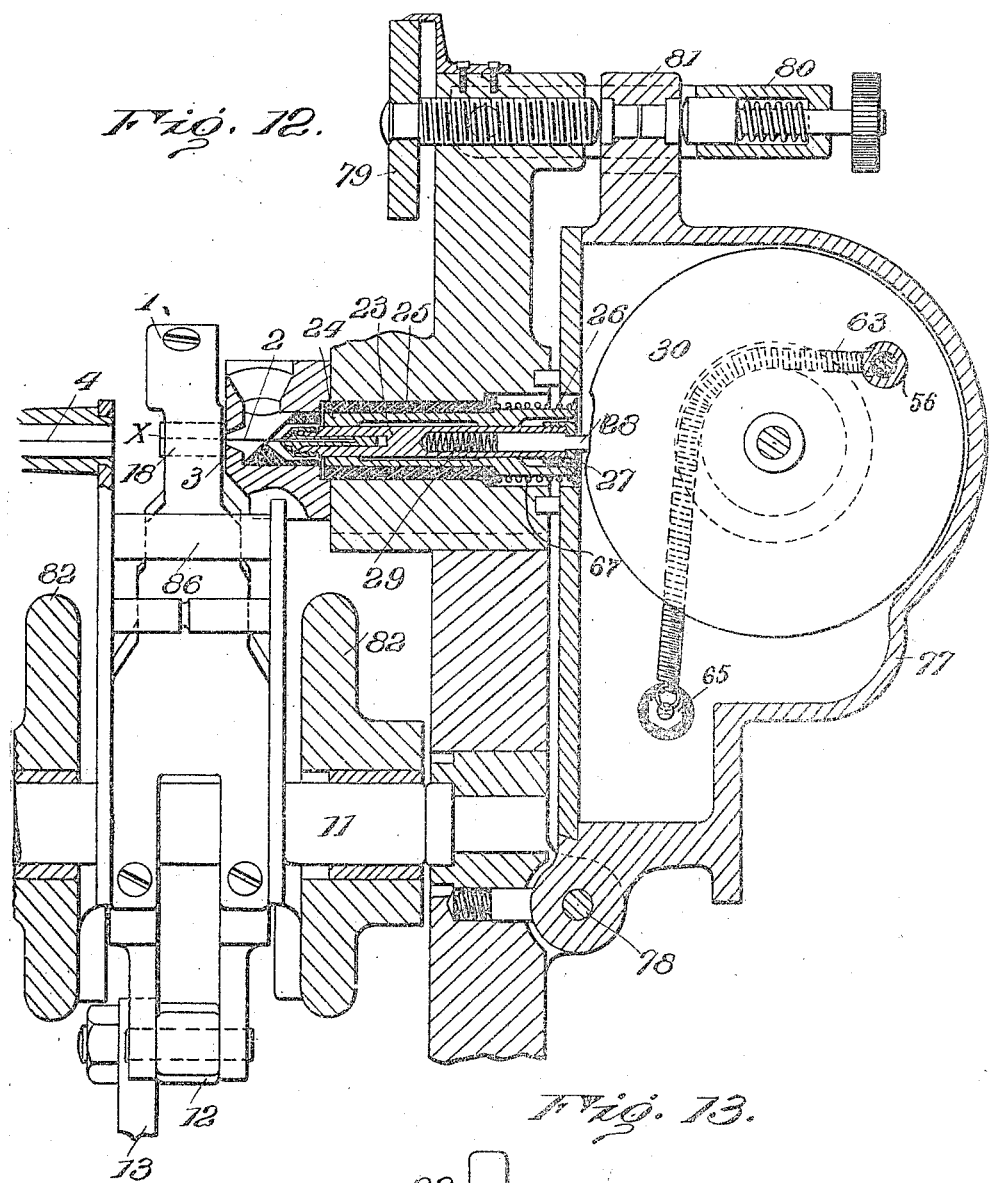

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

GAGING AND SORTING MECHANISM.

1,149,287.	Specification of Letters Patent.	Patented Aug. 10, 1915.

Application filed January 9, 1914. Serial No. 811,251.

*To all whom it may concern:*

Be it known that I, FRANK H. PIERPONT, a citizen of the United States, residing at Horley, county of Surrey, England, have invented certain new and useful Improvements in Gaging and Sorting Mechanisms; and I do hereby declare the following to be a full, clear, and exact description of the same, reference being had to the accompanying drawings, forming part of this specification, and to the figures and letters of reference marked thereon.

This invention relates to means for measuring the interval between two separated gaging surfaces on a body and for delivering the latter to that one of a plurality of receptacles indicated by the ascertained measurement, and it is specially designed for measuring the depth of the formative cavities of type matrices and separating the latter into groups or classes.

The invention has for its principal objects the production of a machine of this class which shall not only be automatic and speedy in its action, but shall be so reliable and accurate in the performance of its functions as to dispense with the heretofore necessary skilled operator.

As before stated, the invention is chiefly applicable to the measurement and sorting of type matrices, and will be described in this connection.

The matrices to be operated upon are usually in the form of short blocks of metal, rectangular in cross section with one end flat and containing a sunken or formative matrix cavity. The flat end of the matrix which is designed to contact with the mold and the bottom of the matrix cavity which produces the ink receiving or printing face of the type constitute gaging surfaces for determining the height to paper dimensions of the produced type, hence the necessity for an accurate spacing of said gaging surfaces, and the rejection for commercial use of such matrices as are found to be defective in this particular.

According to the present invention the bodies or matrices are fed automatically, one at a time, to a carrier, the latter reciprocating between two stations, the one the gaging or measuring station, and the other the receiving and discharging station, said carrier moving directly from one station to the other, and dwelling at each long enough for the performance of the operation of discharging and charging the carrier and measuring the matrix while in the carrier.

The gaging or measuring mechanism is brought into action when the carrier is at the measuring station, to determine the extent of movement of the discharging or delivering mechanism located at the receiving and discharging station and brought into action when the carrier is shifted to said station after having submitted the contained matrix to the action of the measuring mechanism, to deliver the matrix to one or the other of a plurality of receiving stations or places of deposit in accordance with the ascertained measurement.

The body receiving position of the carrier is also the body discharging position, and after receiving a body the carrier travels directly to the gaging position where it stops, and the body is advanced into contact with an anvil or gaging surface through which latter the measuring device is automatically advanced to enter and engage the bottom of the matrix cavity. The advance of the measuring device is automatically arrested when it contacts with the matrix, and its movement automatically determines the position of a gaging or stop member which regulates the extent of advance of a discharging mechanism, the latter operating, after the carrier has returned to the discharging position, to place the measured body in or opposite one of a plurality of holders in accordance with the ascertained measurement.

Figure 2:
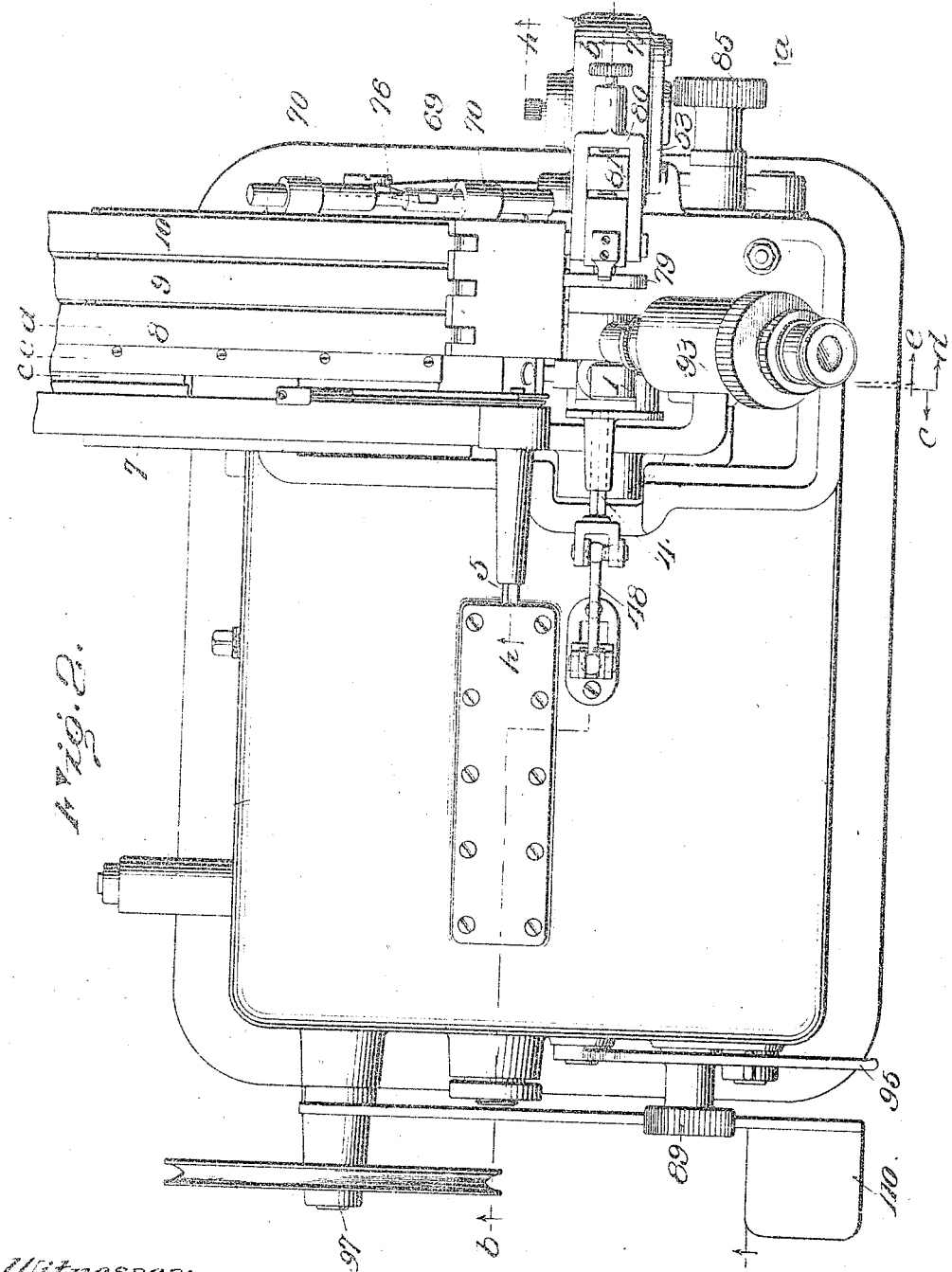
Figure 3:
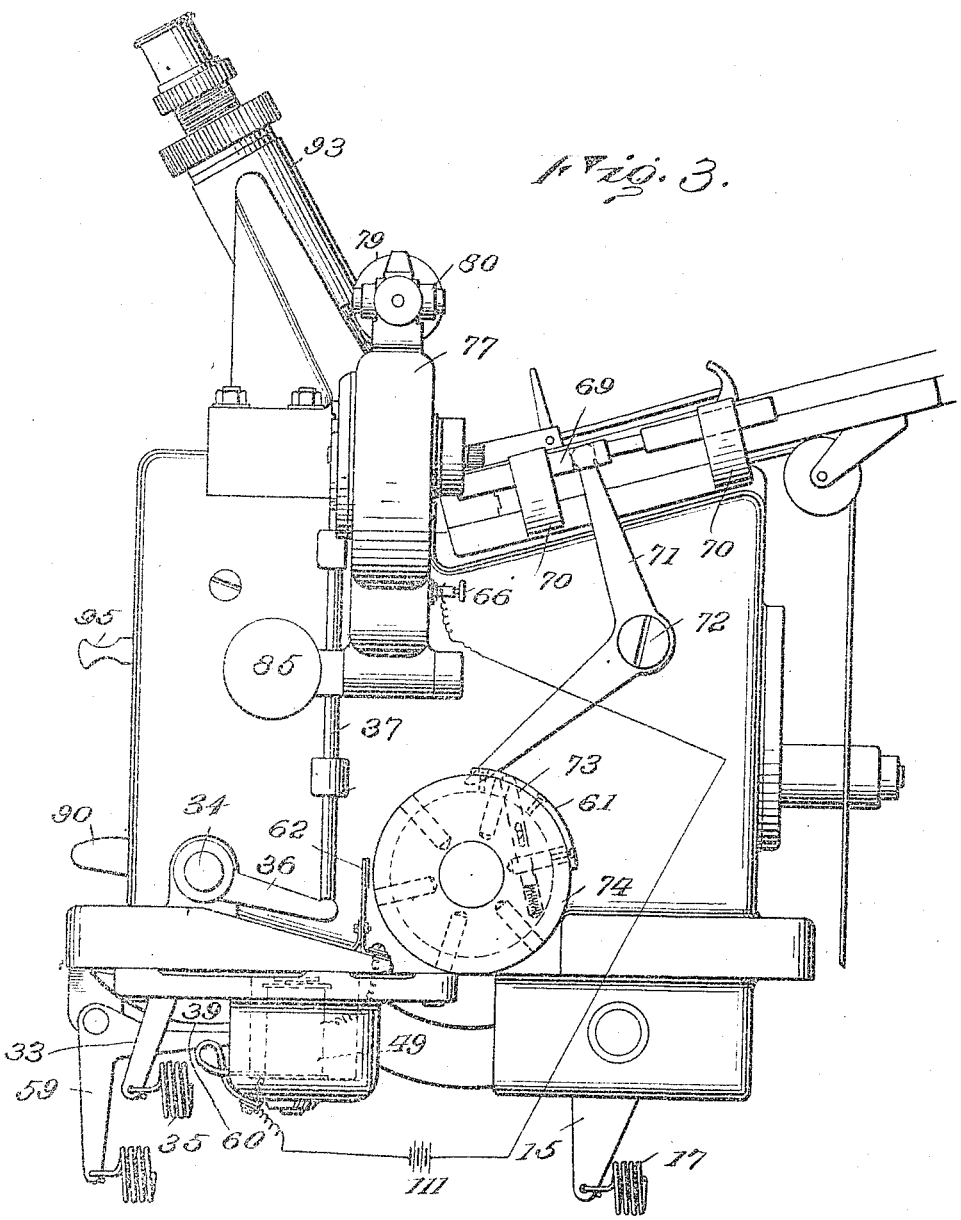
Figure 4:
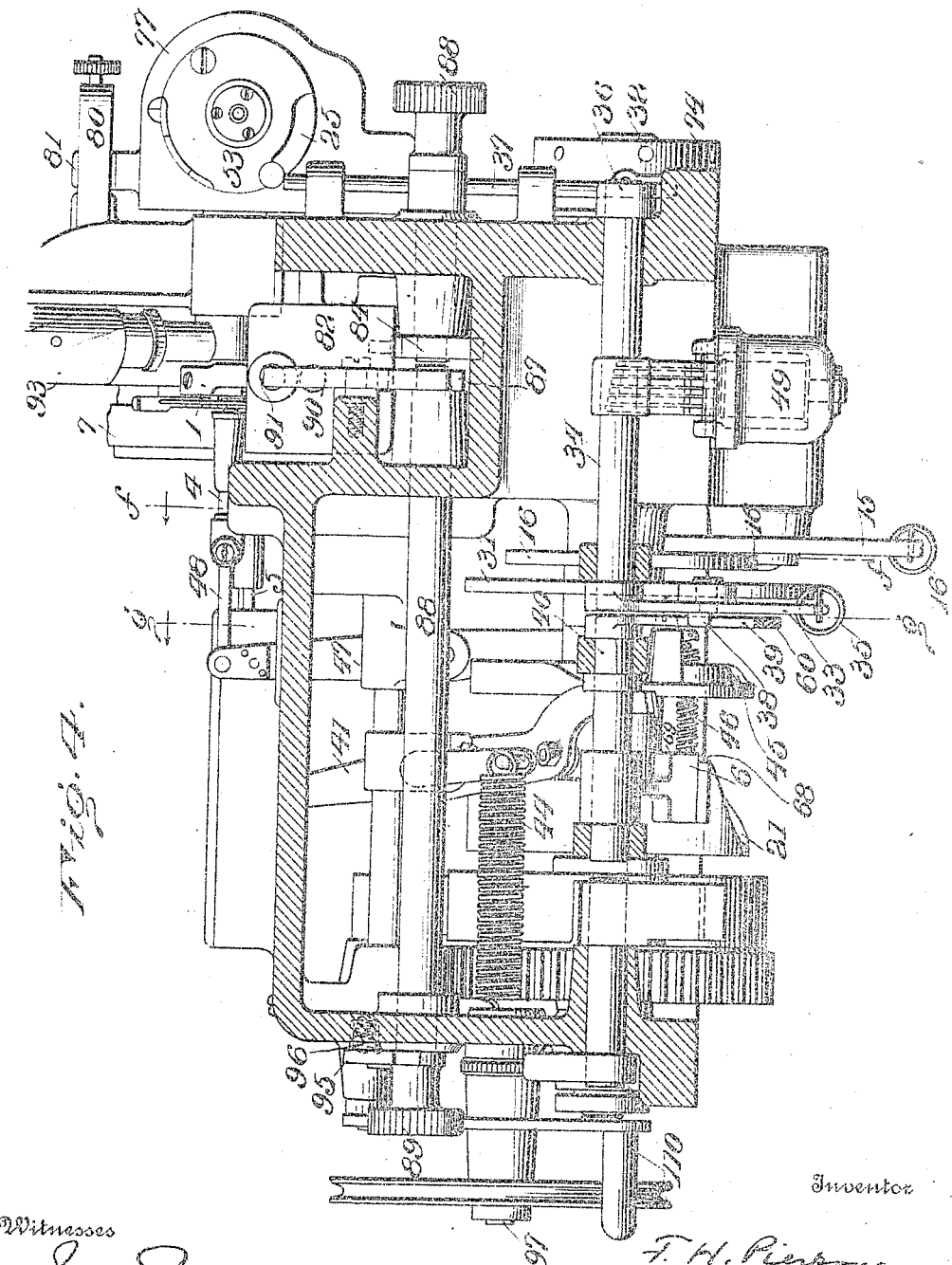
Figure 5:
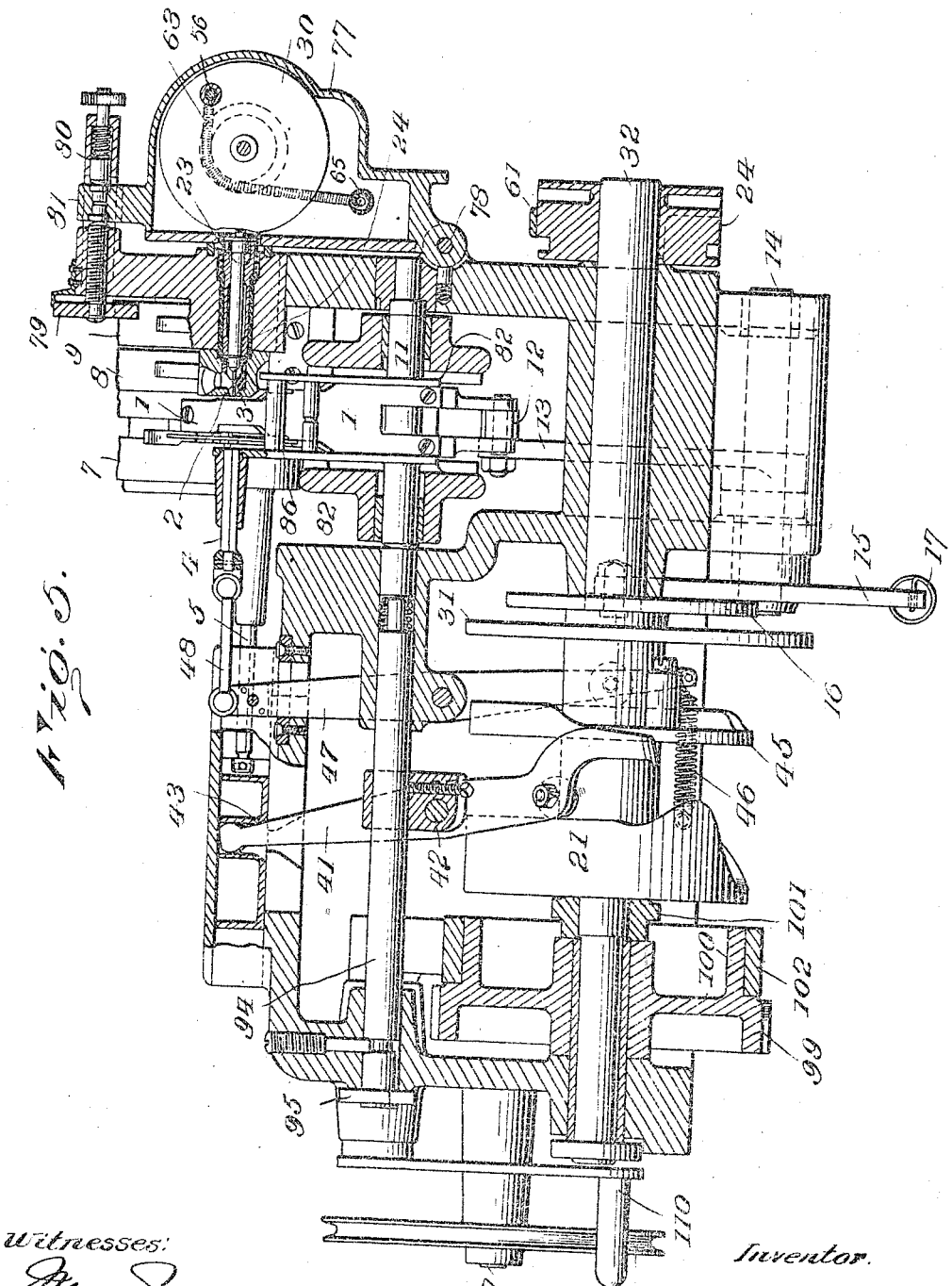
Figure 6:
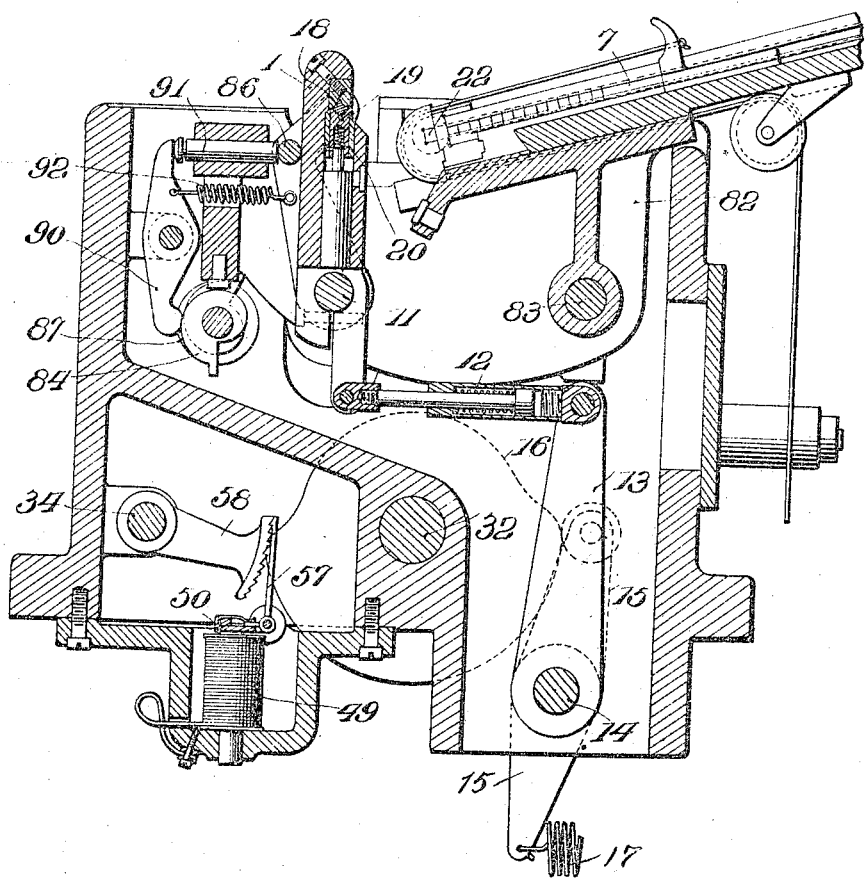
Figure 7:
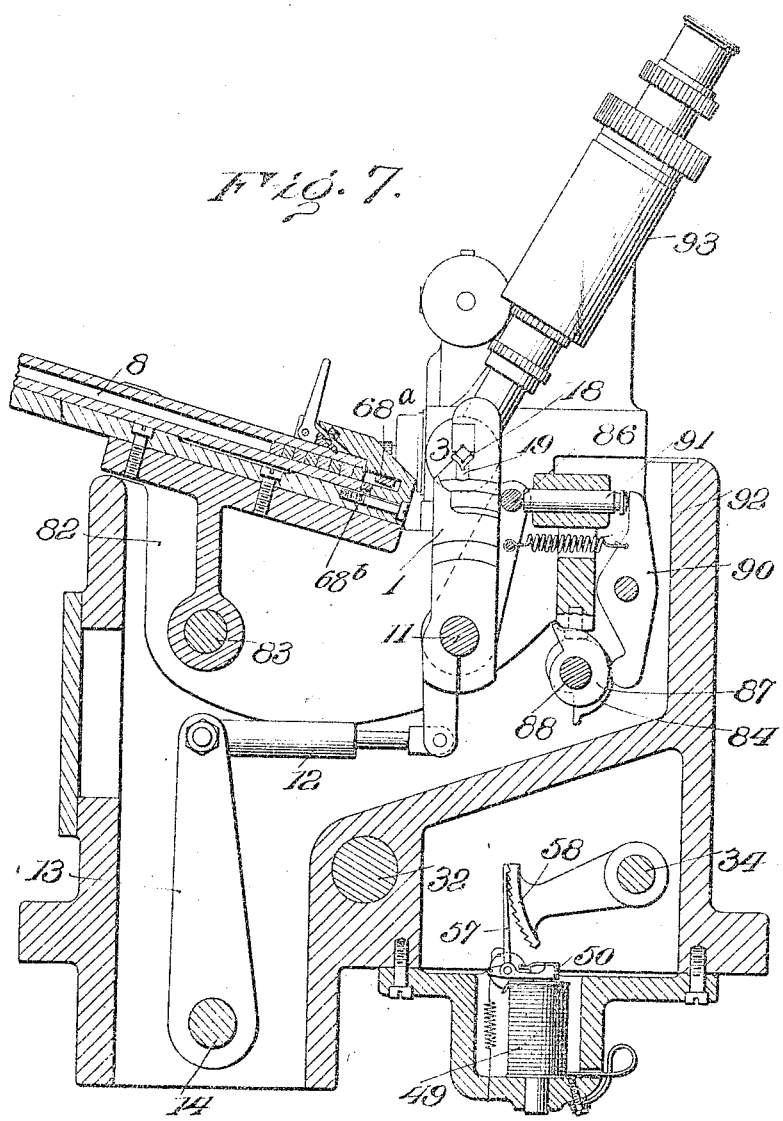
Figure 8:
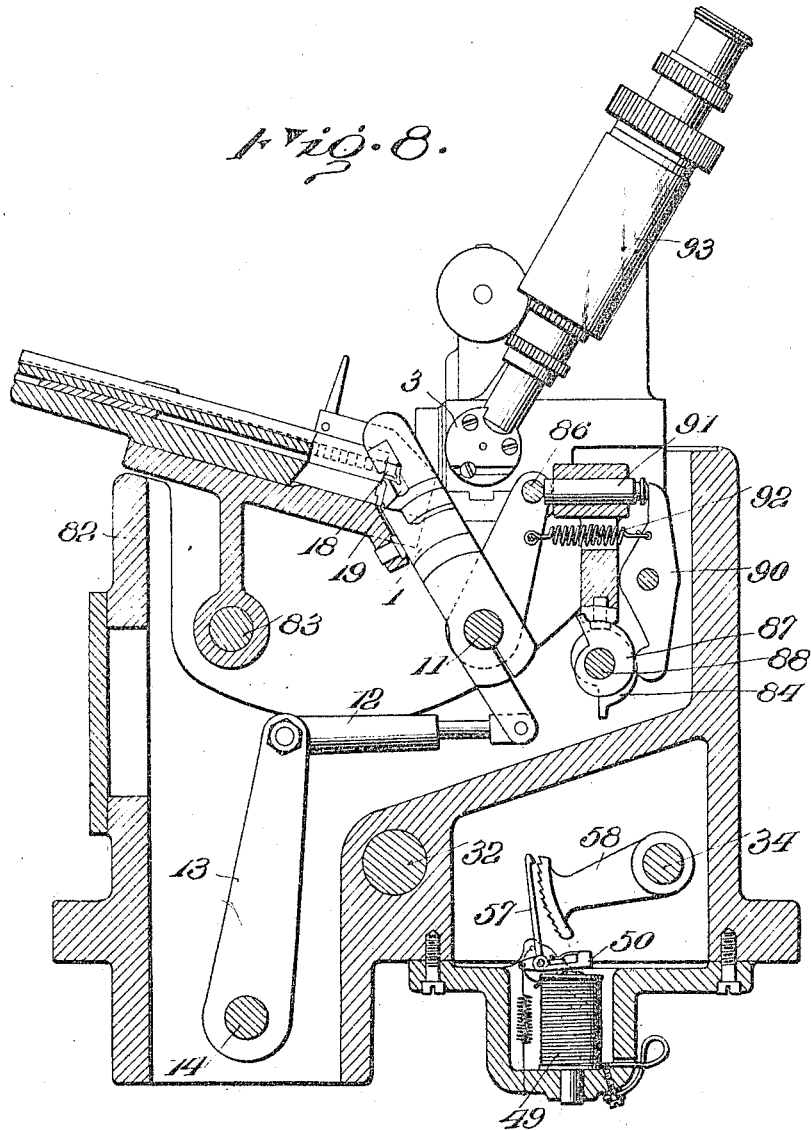
Figure 9:
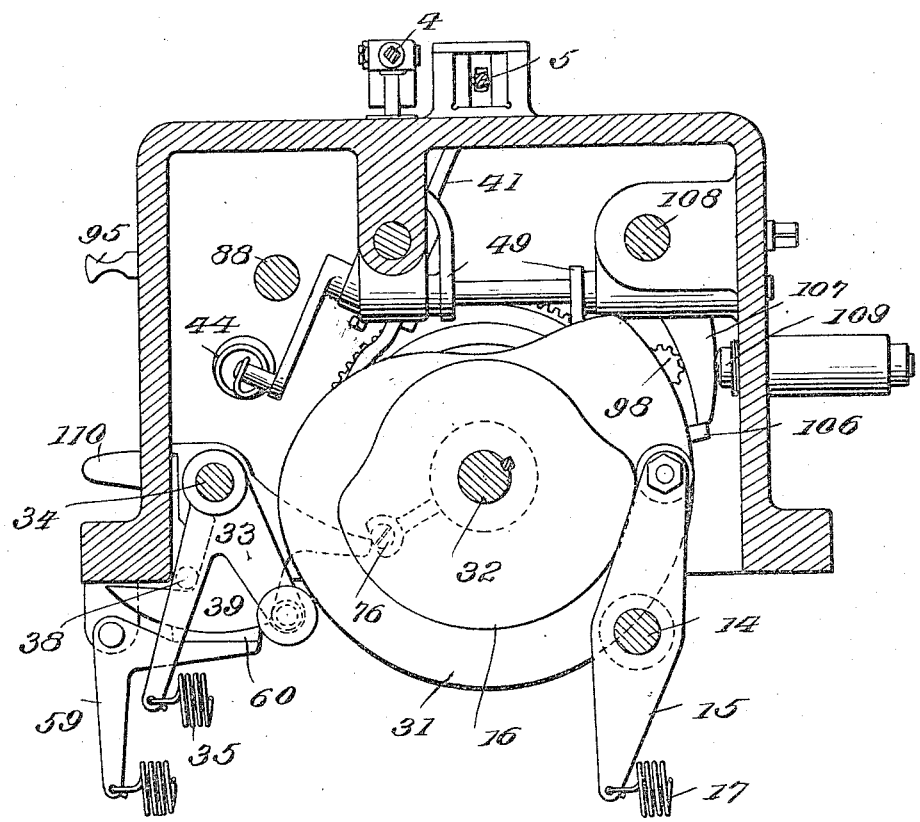
Figures 10, 10A:
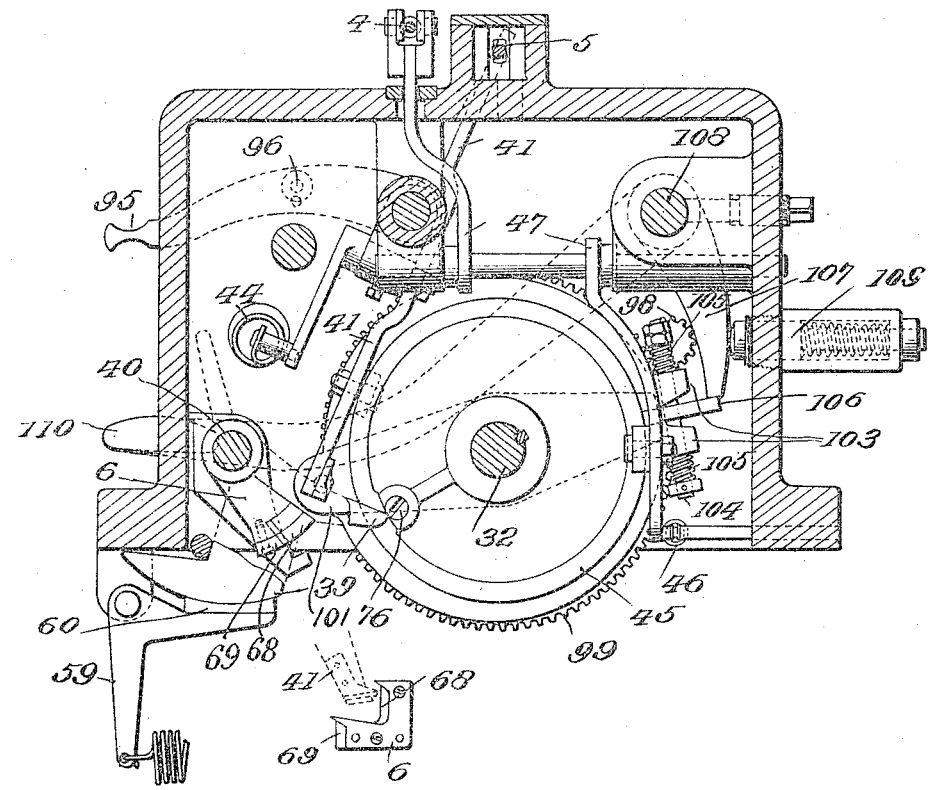

Referring to the drawings illustrating a preferred form of embodiment,—Figure 1 is a front elevation of a machine embodying the present invention. Fig. 2 is a top plan of Fig. 1 showing the carrier in the testing or measuring position. Fig. 3 is a right hand side elevation of Fig. 1. Fig. 4 is a longitudinal section on the line *a—a* of Fig. 2. Fig. 5 is a longitudinal section on the line *b—b* of Fig. 2. Fig. 6 is a transverse section on the line *c—c* of Fig. 2. Fig. 7 is a transverse section on the line *d—d* of Fig. 2. Fig. 8 is a transverse section on the line *e—e* of Fig. 2 but with the carrier in the ejecting or receiving position. Fig. 9 is a transverse section on the line *f—f* of Fig. 4. Fig. 10 is a transverse section on the line *g—g* of Fig. 4. Fig. 10ᵃ is a detail view of the stop for determining the extent of travel of the delivery pusher. Fig. 11 is a sectional plan of the machine showing the measuring device. Fig. 12 is a section of the micrometer adjusting device for the measuring device, and drawn to a larger scale than the other view, and Fig. 13 is a partial transverse section on the line *h—h* of Fig. 2.

The same letters of reference indicate the same parts throughout the drawings.

1 is the carrier. 2 the measuring device. 3 the gage plate. 4 the matrix-positioning device. 5 the feeding and delivery device. 6 the stepped gaging member or device (to be presently described) positioned from the measuring device to determine the extent of movement of the delivery device 5. 7 the supply galley. 8, 9 and 10 the receiving galleys.

The carrier 1 moves to and fro directly between two points or stations, that at which it receives a matrix from the galley 7 or one is delivered from it for one of the galleys 8, 9, 10, and the measuring or testing position or station.

In the present example the carrier is mounted to oscillate on a shaft 11 and is connected through a link 12 with a lever 13 mounted on a shaft 14 which latter is provided with a lever 15 held in engagement with a cam 16 by a spring 17. The cam moves the carrier in one direction and the spring returns it. The link 12 contains a spring coupling to allow for variations in movement.

A matrix X is delivered from the galley 7 to a seat 18 (see Fig. 6) in the carrier, when the latter is in the position shown in Fig. 8, by the feeding pusher 5. The seat 18 conforms to the outside shape of the matrix and one jaw 19 of the seat is movable and is pressed toward the other or stationary jaw by a spring 20 (see Fig. 6). To deliver a matrix to the carrier 1, the pusher 5 is drawn back conveniently by a cam 21 (Figs. 4 and 5) from the position shown in Fig. 11 to open the outlet end of supply galley 7 and allow a matrix to advance from the galley into the channel 22 in front of the pusher. The delivery of matrices from the galley 7 when the pusher 5 is withdrawn from channel 22 at the outlet end of the galley is controlled conveniently by a loaded follower in a well-known manner. After a matrix moves into position in front of the pusher, the latter is advanced and places the matrix X into the seat 18 in the carrier, which latter is then moved to transfer the matrix to the measuring position or station.

The measuring mechanism comprises a needle 2 (see Figs. 5 and 11) which is mounted in a holder 23 that slides in a bearing or sleeve 24, the latter surrounded by an insulating sleeve 25. One end of sleeve 24 is provided with one or more longitudinally disposed pieces or projections 26 (Fig. 12) passing through slots or openings in the head 27 of the needle holder 23 to prevent rotation of the latter, and in the outer end of said holder is arranged a shouldered pin 28 passing through and held against head 27 by a spring 29. The holder with the needle is advanced by a cam 30 engaging pin 28 until the point of the needle contacts with the bottom of the character impression in the cavity of the matrix X, that is to say, it contacts with one surface of the matrix the distance of which, relative to another surface of the matrix, *i. e.* the end surface, is to be measured. When this contact takes place the farther advance of the needle is arrested automatically. The measured advance of the needle 2 also through connections to be presently described controls the setting of the stop device or stepped gage 6 (see Figs. 10 and 10ª) which determines the extent of movement or advance of the pusher 5, to eject a matrix from the carrier and position the same according to the ascertained measurement.

Conveniently the advance of the needle or its advancing cam and the setting of the device 6 are controlled from a cam 31 carried on the cam shaft 32 (see Fig. 9). Against this cam 31 a lever 33, mounted on a shaft 34, is pressed by spring 35.

Fixed to the shaft 34 is a lever 36 (see Fig. 3) on the outer end of which rests a rod 37 connected at its upper end to the cam 30 (see Figs. 1 and 3).

On the lever 33 is a pin 38 (Fig. 4) which bears against a lever 39 carried on a shaft 40 which is mounted in line with the shaft 34 and on which the stop device 6 is carried.

The device 6 is furnished with steps or shoulders according to the number of different stages of advance which it is desired to give to the pusher in delivering a matrix from the carrier. One or other of the shoulders or abutments is adapted, in accordance with the amount of movement imparted to the device 6 to be interposed into the path of a lever 41 which is pivoted at 42 and has its upper end connected to a slide 43 coupled to the pusher 5. The cam 21 withdraws the pusher which is returned or advanced until its lever engages the stop 6 (see Figs. 10 and 10ª) by a spring 44 (see Fig. 4).

Inasmuch as the permissible throw of the lever 41 as limited by the form of the cam 21 to advance the pusher 5 corresponds to one of the positions where a matrix is to be delivered to the galley, it becomes unnecessary to employ a stop device 6 having more than two stop faces or shoulders for determining the intermediate positions at which the pusher must be arrested. The shape of the cam 21 is such that the normal position of the pusher is in front of the supply galley 7, thus blocking the escape of matrices from this galley, and when a matrix previously delivered to the carrier has been properly sized and the carrier has returned to its receiving and discharging position, the cam 21 permits the pusher to advance thereby pushing the matrix out of the carrier and into a position which may be determined either by the cam if the pusher is to make a full stroke, or by the stop device 6, if it is to make a stroke corresponding to either of the intermediate positions for delivering the matrix to galleys 8 or 9. The pusher is immediately withdrawn after the delivery of the matrix to a point beyond the discharge or exit of the supply galley 7 so that a matrix feeds down in front of the pusher and the pusher then advances a sufficient distance to place that matrix in the carrier when its motion is arrested and the other functions of the machine continued.

The stop device 6 is shown in Figs. 4, 10 and 10ᵃ of the drawings as an arm projecting from a sleeve on the shaft 40, and by reference to Fig. 4 it will be noted that it is provided with two faces 68 and 69 located in different planes longitudinally of the axis of the shaft 40. When the movement of the shaft 40 is insufficient to swing either of the faces 68 or 69 into the path of the end of lever 41 the lever makes a full excursion, as before described, but when the shaft 40 is moved so as to bring one or the other of the faces 68 or 69 into the path of the end of the lever 41, the lever is arrested at either one or the other of the intermediate positions so as to determine the proper delivery point to which the pusher advances the matrix.

When the matrix X in the carrier 1 is opposite the measuring needle 2, it is pressed against the gage plate or anvil 3 by the pusher 4 (see Figs. 5 and 11) so that the needle will accurately measure the difference in distance between the end of the matrix containing the matrix cavity and which is pressed against the gage plate and the bottom of the character representation in the said cavity.

The pusher 4 is conveniently actuated from a cam 45 and spring 46. The spring 46 presses against the cam a lever 47 which is connected to the pusher 4 by a link 48. The spring 46 serves to advance the pusher 4, and the cam 45 to withdraw it.

The pusher 4 having advanced or pressed the matrix against the anvil, the measuring needle is advanced until the point thereof touches the surface of the character or symbol in the cavity in the end of the matrix. When the needle so touches, an electric circuit is closed and an electromagnet 49 is energized to attract an armature 50 (see Figs. 6, 7 and 8). The holder of the needle is insulated from the surrounding bearings and the contact is made through the cam, the other terminal being the carrier and matrix therein. With this end in view the cam is insulated from its supporting frame or casing and the rest of the machine as by mounting the supporting bearings 51 for its shaft, (Fig. 11) within insulating sleeves 52 and by connecting the pivoted plate or lever 53 which is engaged by rod 37 to advance the cam 30, through a pin 54 supported within an insulating sleeve 55 located within a socket member 56 attached to cam 30. The movement of armature 50 causes a pawl 57 to engage a toothed segment 58 mounted on the shaft 34. Preferably a series of pawls 47 of different lengths is employed as indicated in Fig. 4 to insure engagement.

The cam shaft 32 continues to rotate but the shaft 34 is held from rotating further by the segment 58 and pawl 57, and after the circuit is broken the stop device is retained in position by a brake which is in the form of a spring-controlled lever 59 having a brake shoe or block 60 adapted to bear on the end of the lever 39.

To prevent sparking and injury to the needle 2 when the circuit is broken, a contact member 61 and wiper 62 are provided, the one carried by the cam shaft 32 and the other by the frame. The arrangement is such that the member 61 in rotating contacts with the wiper 62 before the needle 2 is in contact with the matrix and breaks contact again before the needle is withdrawn.

After the stop device 6 has been set and locked as above described, the pusher 4 and needle 2 are withdrawn. The pusher 4 is withdrawn positively by its cam 45 and the cam 31 in rotating restores the lever 33 and rod 37 to initial position.

The return of the cam disk 30 to initial position is effected through the medium of a spring 63 attached at one end to socket 56, extending over roller 64 of insulating material and having its opposite end secured to a pin 65 insulated from the frame or casing and terminating in a binding post 66.

The needle 2 is returned or held in contact with the cam 30 by a spring 67 encircling sleeve 24 and engaging the head of the needle holder. The spring 29 acting upon the cam engaging pin 28 in the needle holder is of greater tension than retracting spring 67 and serves to maintain contact between the shoulder of said pin 28 and the head of the holder during the advance of the needle, but is capable of yielding when contact is made between the needle and matrix.

The carrier is now returned to the receiving and delivering point and when in that position the pusher 5 is advanced as described, until the lower end of its controlling lever engages the particular step or shoulder of the stop 6 for the time being interposed in its path, and so locates the matrix delivered from the carrier in line with the entrance of one or the other of the receiving galleys 8, 9 or 10.

If the matrix last measured has the character cavity shallow or under standard, then the needle will not advance far enough to effect the interposition of the stop 6 into the path of the lower end of the lever 41 and the pusher 5 will make its full stroke as before described and locate the matrix in line with the entrance of galley 10. If the cavity in the matrix is of standard depth, the stop 6 on account of the distance moved by the needle will be placed so that the lower end of the lever 41 will be stopped by the step 68 and the matrix will be located in line with the entrance to galley 9, and if the cavity is too deep or above standard then the stop 6 will be so moved that the lower end of the lever 41 will contact with the shoulder 69 and the pusher 5 will advance a less distance and the matrix will be located in front of galley 8.

For delivering the matrices discharged from the carrier into one or other of the galleys 8, 9, 10, a pusher 68$^a$ is provided. Conveniently this pusher is long enough to serve for all three galleys and is carried on a rod 69 (see Figs. 3 and 11) mounted to slide in bearings 70, and having connected to it one end of a lever 71 pivoted at 72 and having its other end projecting into the path of a cam piece 73 carried by a disk 74. The cam piece is resiliently mounted to prevent damage to parts should any obstruction arise. The pusher is returned by a spring 75 acting upon the rod 69. The matrices may be retained in the position to which they have been advanced by the pusher 68$^a$ by the frictional engagement of the walls of the galley, or, if desired, a retaining means such, for example, as the friction or retaining block 68$^b$, Fig. 7, may be employed for this purpose. After the stop device has acted to determine the extent of movement of the pusher 5, it is returned to initial position by a cam 76 which acts on an arm of lever 39 (see Figs. 9 and 10).

To allow the extent of advance of the needle 2 by the cam 30 to be adjusted according to a standard and to take up wear in the needle, the shaft of this cam is mounted in an inclosing frame 77 hinged at 78 and having a micrometer screw 79 bearing against its opposite side so that by adjusting this screw the cam can be set back or forward relatively to the needle. The frame is held against the screw by a loop 80 hinged to the machine body embracing a projection 81 on the hinged frame and having a spring-controlled plug bearing on the projection.

To enable the machine to be employed with matrices having different symbols and characters, it is necessary that the carrier be adjustable relatively to the needle without altering its position when delivering or receiving a matrix. The carrier 1 and the support for the galleys are therefore mounted in a cradle or frame 82 which is movable around a shaft 83 (see Fig. 7), the shaft 11 of the carrier being mounted in bearings 70 in the sides of the cradle.

For moving the carrier 1 vertically, the cradle 82 is turned on its shaft by a cam 84 upon which the front member of the cradle rests. The cam 84 is carried by a shaft and adjusted by a handle 85.

For adjusting the position of the carrier horizontally relatively to the needle 2 there is mounted on the carrier shaft two end members carrying a bar 86 against which the carrier rests when in the measuring position. This bar is adjusted relatively to the needle by a cam 87 mounted on a shaft 88 having an adjusting handle 89 and bearing on the cam is one end of a pivoted lever 90, the other end of which is pressed against a pin 91 bearing on the bar 86, and said bar and lever 90 are connected by a spring 92.

A microscope 93 is provided to enable the adjustment of the matrix relatively to the needle to be accurately accomplished.

When it is desired to bring a matrix back again to the measuring position the delivery pusher 5 is rendered inoperative, and this is accomplished conveniently by mounting the pivot 42 of the lever 41 on a shaft 94 so that by turning this shaft by means of a handle 95 the lever is moved from the path of its operating cam and is retained in either position by a locking pin 96.

The drive is transmitted from a pulley shaft 97 carrying a pinion 98 meshing with a gear 99, the latter mounted to rotate freely on cam shaft 32 and provided with an annular flange 100 forming part of a one revolution clutch. The other or complemental member of the clutch includes a cross head 101 fast on cam shaft 32 and carrying a contractile split ring 102 encircling flange 100. The ends of the split ring 102 are furnished with offsets 103 through which passes a bolt 104 bearing compression springs 105 applied in a manner to close the ring and cause it to grip flange 100 for transmitting motion from one to the other. Located between and engaging the opposite end of ring 102 is the clutch opening lever 106, in position to be engaged by an arm or pawl 107 carried by a shaft 108. Pawl 107 is normally held in position to engage lever 106 by a spring pin 109, and its withdrawal to start the machine or continue it in action is effected by pressure upon a hand lever 110. When the hand lever is depressed to withdraw the clutch-opening pawl and then released, the machine will make one revolution and then stop; but where several matrices of a sort are being measured the handle can be held down to allow the machine to run continuously. The circuit connections are indicated in Fig. 3 wherein the battery or generator 111 is connected on one side to the needle through binding post 66, spring 63, cam 30 and holder 23, and on the other side to the matrix through magnet 49, wiper 62, contact 61, cam shaft 32 and the frame and connections to carrier 1.

Assuming that the parts are in the position shown in Fig. 8 of the drawings, the pusher 5 has been withdrawn past the exit of the galley 7, best seen in Fig. 11, so that a matrix X has dropped down in front of the pusher. Further movement of the cam 21 will advance the pusher a short distance or a sufficient distance to feed the matrix into the carrier when the pusher will cease to advance; the carrier through its connections 12 and 13 with the shaft 14, and the connections of the shaft 14, including the spring 17 and cam 16, will advance from the position shown in Fig. 8 to the position shown in Fig. 7, bringing the matrix into line with the measuring devices. When the matrix arrives at this point the holding plunger 4 is advanced through its connection with the lever 47, and the latter, through its operating spring 46, is controlled by the cam 45 to push the matrix against the gaging face 3. At this time the parts will have advanced to a position where the cam 31 will permit the lever arm 33 to advance under the influence of the spring 35 and through the shaft 34, arm 36, pin 37, and cam 30, advance the measuring needle into the cavity in the matrix. As soon as the needle comes in contact with the matrix the electric circuit is established thereby energizing the electro-magnet 49 and through the operation of the stop pawls 57 the further movement of the shaft 34 is instantly arrested. In addition to moving the measuring needle, the shaft 34 has through the projection 38 and lever arm 39 advanced the shaft 40. Assuming that the gaging faces on the matrix are in proper relation to each other the advance of the shaft 40 will bring the stop face 68 of the stop device 6 into position to intercept the end of the lever 41 and the shaft 40 and stop device will be held in such position by the brake 60. The measuring needle is now permitted to retract, this being due to the continued rotation of the cam 31 which imparts a reverse movement to the shaft 34 allowing the rod 37 to drop or move downwardly and the spring 63 to act in returning the cam 30 to its initial position. The needle itself is, of course, directly retracted by the action of the spring 67. When the needle has withdrawn from the cavity in the matrix the carrier is returned to the position shown in Fig. 8 and the plunger or pusher 5 is advanced, as hereinbefore described, by its spring acting on the lever 41 under the control of the cam 21, whereby the matrix is pushed out of the carrier and into position to be delivered to the intermediate galley 9, for under the assumption hereinbefore indulged in, the matrix is of standard dimension and the lever 41 which advances the plunger has been arrested by the stop surface 68 on the stop device 6, which stop device has been held in its adjusted position up to this time by the brake 60. The pusher immediately retracts to a position beyond the supply galley 7, another matrix drops down in front of it, and it again advances to push the matrix into the carrier. In the meantime the cam projection 76, through its engagement with the arm 39, on the shaft 40, has restored the shaft 40, together with the stop device 6, to their initial positions and the parts are ready for the next gaging operation, as described.

It will be noted that the gaging surface 3 and the gaging surface formed by the point or end of the needle are not opposed to each other, but both face in the same direction, being adapted to gage the distance between surfaces on the blank both facing in the same direction but opposite in direction from that in which the gages face. Owing to the conditions just recited the blank can not be moved by the gages while the gaging surfaces are in contact and the position of the stop mechanism for determining the point of delivery in sorting the gaged blanks is therefore determined or fixed by the movement of the movable gage or needle alone, or more broadly expressed, by the relative movement of the gages and in accordance with such relative movement.

In my prior application Serial No. 620,392, filed April 11, 1911, claims are made for a gaging and sorting mechanism, which claims are of a scope to include the gaging and sorting mechanism illustrated and described herein, and hence the omission of such claims from this application is not to be considered as an abandonment of the subject matter.

Having now particularly described and ascertained the nature of the said invention, and in what manner the same is to be performed, what I claim is,—

1. In a gaging and sorting machine, the combination of the following elements, to-wit, a blank carrier, gaging members for coöperating with a blank mounted in said carrier for determining the relation of gaging surfaces on the blank, a series of galleys, a receiving channel communicating with all of said galleys, a pusher for advancing the blank from the carrier into said channel and means for variably advancing the pusher to feed a blank into position for entering one or the other of the galleys, as the case may be.

2. In a gaging and sorting machine, the combination of the following elements, to-wit, a blank carrier, gaging members for determining the relative position of surfaces on the blank held by the carrier, a discharge channel, means for moving the carrier from the gaging position to the discharge channel, and vice versa, a reciprocatory pusher for moving the blanks from the carrier into the discharge channel, receiving channels opening into the discharge channel at different points in the length of the latter, and mechanism controlled in accord with the relative movement of the gaging members for advancing the pusher to position the blank in the discharge channel opposite one or the other of the receiving channels.

3. In a gaging and sorting machine, the combination of the following elements, to-wit: a fixed gage and a normally retracted movable gage, both of said gages having their operative surfaces facing in the same direction, mechanism for advancing the movable gage, means for holding a blank in contact with the fixed gage, and in position for coöperation with the movable gage, delivering mechanism for removing and sorting the gaged blanks, a stop mechanism for variably determining the movement of the delivery mechanism, operating connections intermediate the gage advancing mechanism and stop mechanism for positioning the latter in accordance with the advance of the movable gage, means for holding the stop mechanism in its adjusted position, means whereby the movable gage and its advancing mechanism are returned to normal position independently of the stop mechanism and preliminary to the delivery of the gage blank, and means whereby the stop mechanism is returned to normal position subsequent to the delivery of the gage blank.

4. In a gaging machine, the combination of the following elements, to wit: gaging members for determining the relative position of the surfaces on a blank, a carrier for presenting the blanks to the gaging members, means for moving said carrier into and out of gaging position, a pusher for discharging the blanks from the carrier, a channel in which said pusher works extending on opposite sides of the carrier, a plurality of galleys communicating with said channel, a cam for operating the pusher while the carrier is in delivering position to first discharge a blank from the carrier and to subsequently position another blank into the carrier, stop mechanism for arresting the blank discharging movement of the pusher at different points in the channel, and operating connections intermediate one of the gages and said stop mechanism, whereby the stop mechanism will be positioned in accordance with the movement of the gage to arrest the pusher and effect a distribution of the blanks in accordance with the relation of their gaging faces.

5. In a gaging machine, the combination of the following elements, to wit: a movable blank carrier, gaging members adapted to coöperate with the blank held in the carrier, means for effecting a relative movement of the gaging members to determine the relation between different faces on the blank, means for moving the carrier from the gaging position to a blank discharging position, a channel with which the carrier registers when at the discharging position, a pusher movable longitudinally in said channel, a series of receiving galleys communicating with the channel, means for operating said pusher embodying a spring-pressed lever for advancing the pusher, a cam for retracting the pusher, a movable stop mechanism for arresting the advance of the pusher when a blank has reached a position in the channel opposite one or the other of the galleys, and operating connections intermediate the stop mechanism and movable gage whereby the stop mechanism will be positioned in accordance with the movement of the gage.

6. In a gaging machine, the combination of the following elements, to wit: a fixed gage, a movable gage, mechanism for advancing the movable gage, a blank carrier movable into and out of gaging position, a channel with which the carrier registers when out of gaging position, a pusher for discharging a blank from the carrier into the channel, a plurality of galleys communicating with said channel, a variable stop mechanism for determining the advance of the pusher, connections intermediate the stop mechanism and mechanism for advancing the movable gage embodying means whereby the stop mechanism is advanced into operative position and whereby the gage advancing mechanism may be returned to normal position independently of the stop mechanism, means for holding the stop mechanism in its adjusted position, an operating shaft, and connections intermediate said operating shaft and gage advancing and stop mechanism, whereby the gage advancing mechanism will be returned to normal position preliminarily and the stop mechanism returned to normal position subsequently to the discharge of a blank by the pusher.

FRANK HINMAN PIERPONT.

Witnesses:
B. WESTACOT,
O. J. WORTH.